United States Patent [19]
Waldschmidt

[11] Patent Number: 4,766,736
[45] Date of Patent: Aug. 30, 1988

[54] EVAPORATOR COIL HEAT EXCHANGER ASSEMBLY

[75] Inventor: William L. Waldschmidt, Farmington, Minn.

[73] Assignee: Thermal King Corporation, Minneapolis, Minn.

[21] Appl. No.: 107,733

[22] Filed: Oct. 13, 1987

[51] Int. Cl.[4] .............................................. F25B 47/00
[52] U.S. Cl. ......................................... 62/275; 62/298
[58] Field of Search ......................... 62/275, 276, 298; 219/201; 165/76, 79

[56] References Cited

U.S. PATENT DOCUMENTS 2,749,717  6/1956  Duncan et al.
2,819,858  1/1958  Mittendorf.
2,922,017  1/1960  Ripley.
2,930,207  3/1960  Carl et al.
3,320,766  5/1967  King.
3,343,596  9/1967  Kritzer.
3,786,227  1/1974  Seipp et al.
4,394,818  7/1983  Brownfield et al.
4,492,851  1/1985  Carr.

Primary Examiner—Henry A. Bennet
Attorney, Agent, or Firm—D. R. Lackey

[57] ABSTRACT

An evaporator coil heat exchanger assembly of a refrigeration system, such as a transport refrigeration system, which includes an electrical heating element for rapid defrosting of the evaporator coil with its attendant refrigerant carrying tubes and cooling fins. The electrical heating element is quickly attached to the collective edges of the cooling fins by a plurality of low cost spring retainer clips which have one portion which extends between two closely spaced cooling fins to hook a refrigerant carrying tube, and another portion which holds the heating element against edges of the cooling fins with a spring force. The spring retainer clips may be just as quickly removed should the heating element require replacement. Each spring retainer clip is formed from a single piece of metallic wire having first and second curved end sections, and an intermediate portion which functions both as a spring and as a handle.

6 Claims, 3 Drawing Sheets

EVAPORATOR COIL HEAT EXCHANGER ASSEMBLY

BACKGROUND OF THE INVENTION

1. Field of the Invention

The invention relates in general to refrigeration systems, and more specifically to refrigeration systems having electrical heaters for defrosting the evaporator coil heat exchanger assembly.

2. Description of the Prior Art

In refrigeration systems, such as transport refrigeration systems for conditioning the air of a truck or trailer hauling fresh or frozen loads, it is common to rapidly defrost the evaporator heat exchanger assembly with electrical heaters when the frost and ice build-up reduces the effectiveness of air flow over the evaporator. The evaporator section of the refrigeration system includes a plurality of refrigerant carrying tubes, often called hairpin tubes, with a large number of thin, closely spaced metallic heat exchanger plates or fins connected to the coolant tubes. The fins are usually wavy or corrugated to increase the surface area for a given heat exchanger volume. Frost builds up on the fins and impedes air flow over the surfaces of the fins, and it is this frost that must be periodically removed.

U.S. Pat. No. 3,786,227, which is assigned to the same assignee as the present application discloses periodically replacing spaced groups of fins across the heat exchanger assembly with relatively thick metallic plates, each of which has an electrical heating element attached thereto. While this is highly effective, it requires modification of the heat exchanger unit at the time of manufacture, and adds significantly to the manufacturing cost.

Another prior art approach holds an electrical heating element against the edges of the fins with a plurality of spaced metallic channel members, each of which extends across the two legs of a U-shaped electrical heating element. Each channel member includes two spring loaded fasteners, with each spring loaded fastener including a hook, a helical spring, and two large washers. While this approach does not require modification of the heat exchanger at the time of manufacture, the channel shaped device is relatively costly to manufacture and is awkward for one assembler to install. In a transport refrigeration system the evaporator heat exchanger is elevated, requiring an installer to work from below the unit. The heating element must be held against the edges of the fins which make up the lower surface of the heat exchanger, the metallic channel must be placed over the two legs of a heating element, and the two spring loaded fasteners must each be threaded up between two closely spaced wavy heat exchanger fins and attached to a coolant tube. The channel must usually be moved or adjusted along the heating element after the initial placement, until the fasteners are properly aligned with a coolant tube.

In my copending application Ser. No. 930,198 filed Nov. 19, 1986, now U.S. Pat. No. 4,716,275, which is assigned to the same assignee as the present application, I disclosed spring retainer clips which require a single hand to install, freeing the other hand of the installer for initially holding the heating element in heat exchange relation with the heat exchanger fins. Each spring retainer clip is a single piece of wire having first and second ends, with the wire having at least first, second, and third curved sections which proceed in the recited order from the first end towards the second end of the wire. The curved sections are all disposed in a common plane to enable the retainer clip to be easily inserted between two adjacent heat exchanger fins, even when the fins are of the wavy type. The first and second curved sections are respectively disposed about a coolant tube and about the heating element, with the spacing between the first and second curved sections being selected such that a spring force is developed which firmly holds the heating element against the heat exchanger fins. A curved handle is formed adjacent the second end of the wire which enables the retainer clip to be easily held as the first end is inserted between two heat exchanger fins and the first curved section is hooked over a coolant tube. The handle further enables the second curved section of the retainer clip to be pulled downwardly after the first curved section has been hooked to a coolant tube to allow the second curved section to be snapped over the heating element, to hold the heating element tightly against the heat exchanger fins.

While the spring retainer clip of my aforesaid U.S. Patent substantially reduced the cost of holding a U-shaped heating element against an assembly of finned tubes, by about 75% when compared with the hereinbefore mentioned prior art channel type clamping arrangements, it is important that a tight tolerance be held between the first and second curved sections. If a functionally equivalent spring retainer clip could be provided which did not have a critical tolerance between the two curved sections which contact the heating element and finned tube, the cost of manufacturing a spring retainer clip would be reduced by about one-half, as the spring retainer clip could be manufactured on a wire forming machine, instead of on a spring machine.

Thus, it is an object of the present invention to provide a new and improved spring clip for holding electrical heating elements in heat conducting relation with the fins of an evaporator heat exchanger assembly of a transport refrigeration system, which spring clip can be manufactured on a wire forming machine instead of requiring a spring machine.

SUMMARY OF THE INVENTION

Briefly, the present invention is a new and improved evaporator coil heat exchanger assembly which includes an electrical heating element for quickly defrosting the heat exchanger fins of the assembly, and spring retainer clips for holding the heating element against the fins which require only a single hand to install. Instead of having a straight wire section between the first and second curved sections of a spring retainer clip which respectively contact a coolant tube and a heating element, as taught by my copending application, I have disposed a relatively large curved section between these two curved sections which provides a dual function. This relatively large curved section functions both as a spring and as a handle, eliminating the need for the separate handle formed at the end of the spring retainer clip of my U.S. Patent. More importantly, the spring action of the relatively large curved intermediate section has relaxed the tolerance which is essential when the two part holding curved sections are separated by a straight section of wire, enabling the spring retainer clip of the present invention to be made on a wire forming machine. The elimination of a separate handle has also eliminated the need for forming the wire outside the major plane of the part holding curved sections, eliminating an additional and separate forming step. Finally, the relatively large intermediate curved section enables a single size spring retainer clip to handle a relatively wide range of dimensional spacings between cooling tubes and heating elements.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
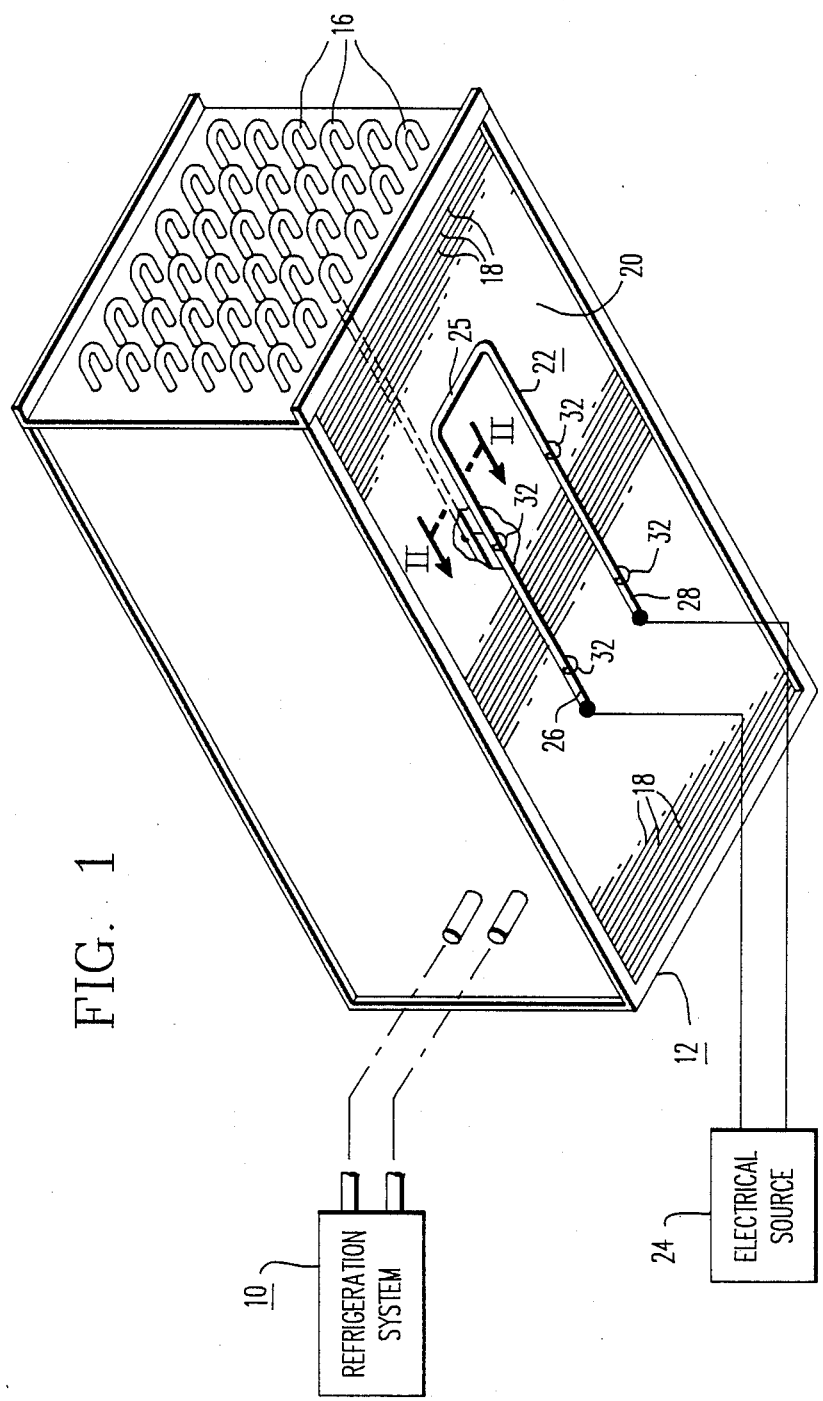
FIG. 1 is a perspective view of an evaporator coil heat exchanger assembly constructed according to the teachings of the invention.

Referring now to the drawings, and to FIG. 1 in particular, there is shown a refrigeration system 10 which may be a transport refrigeration system such as shown in U.S. Pat. No. 4,394,818. This patent, which is assigned to the same assignee as the present application, is hereby incorporated into the specification of the present application by reference. Refrigeration system 10 includes an evaporator coil heat exchanger assembly 12 having a plurality of refrigerant carrying tubes 14, such as hairpin tubes, the ends 16 of which are visible at one end of the assembly 12. The tubes 14 are in thermal flow communication with a plurality of closely spaced metallic cooling fins 18, which are typically spaced about 5 mm apart. The closely spaced fins 18 collectively define a bottom surface 20 of the assembly 12.

In order to provide a supply of heat for rapid defrosting of the fins 18, one or more electric heating elements are held in contact with the bottom surface 20 of assembly 12, such as electric heating element 22. As illustrated, heating element 22 is electrically connected to a source 24 of electrical potential, such as an alternator which is part of the refrigeration system 10. Heating element 22 is in the form of a wire, such as a Calrod heating element, and it may have any desired configuration, such as the U-shaped configuration illustrated which includes a bight 25 and leg portions 26 and 28.

Figure 2:
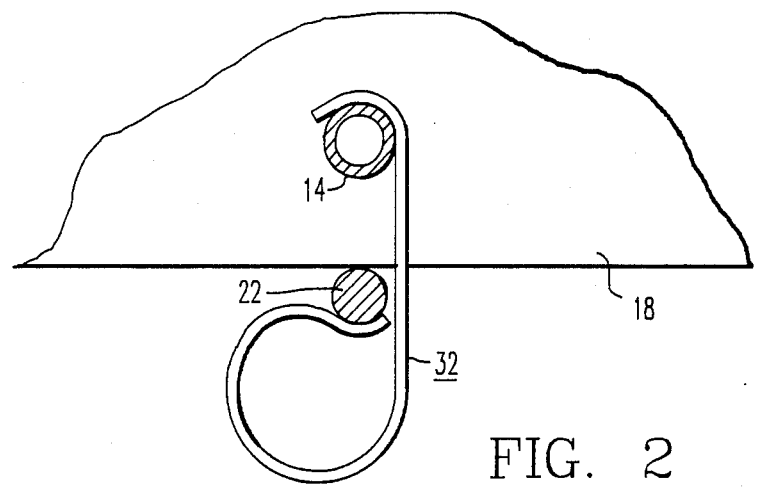
FIG. 2 is a cross sectional view of the evaporator coil heat exchanger assembly shown in FIG. 1, taken between and in the direction of arrows II—II.

According to the teachings of the invention, heating element 22 is held firmly against bottom surface 20 defined by the closely spaced fins 18 by a plurality of spring retainer clips or clamps 32. FIG. 2 is a cross sectional view of a spring retainer clip 32 taken between and in the direction of arrows II—II in FIG. 1. Spring retainer clip 32 is formed from a single piece of metallic wire selected for its ability to withstand the surface temperature of the heating element 22, which may be about 400 degrees C., for example. Spring stainless steel wire, such as 17-7 PH ASTM A 313 (631), having a diameter of about 0.080 inch (1.9 mm) has been found to be suitable.

Figure 3:
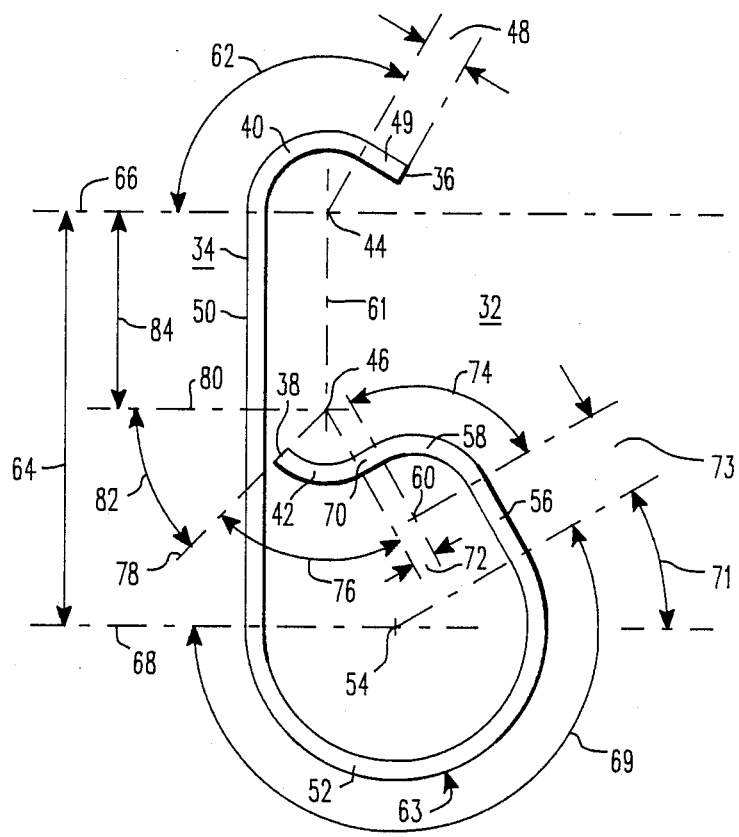
FIG. 3 is an enlarged elevational view of a spring retainer clip constructed according to the teachings of the invention.

FIG. 3 is an enlarged elevational view of spring retainer clip 32. Spring retainer clip 32 is constructed of a single length of wire 34 having first and second ends 36 and 38, respectively. Spring retainer clip 32 has at least first and second curved sections 40 and 42, respectively, having centers 44 and 46, respectively. The first and second curved sections 40 and 42 will be referred to as first and second curved end sections 40 and 42, as they are disposed adjacent to ends 36 and 38, respectively. In a preferred embodiment, curved section 40 is preferably spaced from end 36 by a straight section 49 having a small dimension indicated at 48, such as about 0.2 inch (5 mm), to facilitate hooking the end about a cooling tube.

Curved sections 40 and 42 are separated by a straight section 50 which starts at an end of curved section 40, and also by a relatively large first intermediate curved section 52 having a center 54. The end of curved section 52 may lead into curved section 42, but it has been found that improved spring characteristics are provided when the relatively large first intermediate curved section 52 is followed by a straight section 56 and a smaller second intermediate curved section 58 having a center 60.

The concave sides of curved sections 40 and 42 face one another, with their centers being on a common vertically oriented imaginary line 61. Curved section 40 functions as a hook for "hooking" a coolant tube 14, and curved section 42 functions as a support for a heating element 22. All of the curved and straight sections of clip 32 lie in a common plane, even the portion which functions as a handle, as will be hereinafter explained, so that the spring retainer clip 32 may be easily inserted between two of the closely adjacent cooling fins 18. The portion of spring retainer clip 32 which includes the first and second intermediate curved sections 52 and 58 functions as a combination spring and handle portion 63.

More specifically, the first curved section 40 starts close to end 36 and extends for an arc of about 120 degrees, about center 44, with the 120 degree arc being indicated by double headed arrow 62. The radius of curved portion 40 is selected according to the diameter of the coolant tube 14 it will be "hooked" over, with a radius of about 0.19 inch (5 mm) being suitable for a coolant tube having a diameter of about 0.4 inch (10 mm), for example.

The relatively large diameter first intermediate curved section 52, which may have a radius of about 0.88 inch (22 mm), for example, is spaced from the first curved section 40 by the straight section 50 which has a dimension indicated by double headed arrow 64. Dimension 64, which may be about 1.3 inches (33 mm), for example, extends from an imaginary line 66 drawn through center 44 perpendicular to imaginary line 61, to an imaginary line 68 which is parallel with line 66 and which extends through center 54. Thus, with vertical imaginary line 61 as a reference, imaginary lines 66 and 68 are horizontally oriented in FIG. 3. The orientation of clip 32 shown in FIG. 3 will be the normal orientation of clip 32 during use, but other orientations are possible. Center 54 of the first intermediate curved section 52 is located on the same side of straight section 50 as center 44, and curved section 52 extends for an arc of about 210 degrees, as indicated by double headed arrow 69, ending at a location about thirty degrees above horizontal line 68, indicated by double headed arrow 71. As hereinbefore stated, for optimum spring characteristics, as well as for providing an effective handle which will be located well below the edges of the fins 18 during use, a second intermediate curved section 58 is provided, with the ends of the first and second intermediate curved sections 52 and 58, respectively, being separated by a short straight section 56. Straight section 56 may have a dimension of about 0.3 inch (7.66 mm), indicated at 73, for example. A short straight section 70 also separates curved sections 58 and 42, in the preferred embodiment of the invention, with section 70 having a dimension of about 0.08 inch (2 mm), indicated at 72, for example. The radius of the second curved section 42 is selected according to the diameter of the heating element 22 it will be associated with, with a radius of about 0.19 inch (5 mm) being suitable for a heating element 22 having a diameter of about 0.25 inch (6 to 7 mm). The radius of the second intermediate curved section 58 may be the same as the radius of curved section 42. The concave sides of the first and second curved end sections 40 and 42 face one another, with their centers being disposed on the hereinbefore mentioned common vertical axis 61. Thus, a spring force is provided when curved portion 42 is moved downwardly, which force is substantially vertically directed.

Centers 60 and 46 of curved portions 58 and 42, respectively, are disposed on opposite sides of wire 34, with curved section 58 extending for an arc of about 90 degrees, as indicated by double headed arrow 74, and with curved section 42 extending for an arc of about 75 degrees, as indicated by double headed arrow 76. The radius of the second curved end section 42 is selected to provide a support sufficient to hold heating element 22, with the hereinbefore mentioned radius of about 0.19 inch (5 mm) being suitable. End 38 terminates closely adjacent to straight portion 50, with an imaginary line 78 at the end of arc 76 forming an angle of about 45 degrees from a horizontal line 80 drawn through center 46, as indicated by double headed arrow 82.

Figure 4:
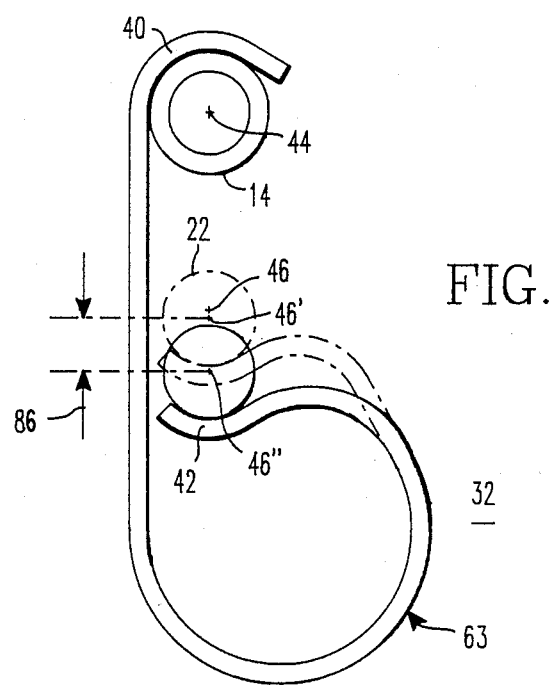
FIG. 4 is a view of spring retainer clip similar to that of FIG. 3, except shown in stressed configurations to illustrate how the tight tolerance between the part holding curved sections has been eliminated while concurrently enabling a spring retainer clip to handle a wide range of dimensional spacings between cooling tubes and heating elements.

In use, the first curved section 40 is inserted between two cooling fins 18 and hooked over a coolant tube 14. The portion of the combination spring and handle 63 which is adjacent to end 38 is pulled downwardly after end 36 has hooked a coolant tube 14, to increase the spacing 84 between centers 44 and 46, to capture the heating element 22. Spacing 84, when clip 32 is unstressed, may be about 0.6 inch (15 mm), for example. As shown in FIG. 4, a downwardly directed pulling force on the upper portion of the combination spring and handle 63 stresses and bends straight portion 56. The stress in straight portion 56 plus the spring action of the relatively large curved intermediate section 52 provides a strong, relatively constant spring force over a substantial displacement of center 46 from its unstressed position, providing a useful range 86 between centers 46' and 46" which completely eliminates the tight tolerance required by the spring clip in my copending application. Thus, curved portion 42 will hold heating element 22 tightly against the bottom surface 20 defined by the edges of the cooling fins 18, as the pulling force on the handle portion 63 is released, over a relatively wide range of spacing dimensions between the cooling tube 44 and heating element 22. A plurality of spring retainer clips 32 may thus be quickly snapped over the heating element 22, to hold it in the desired position, and the clips 32 may just as quickly be removed should the heating element 22 require replacement. A typical number of spring retainer clips 32 required to hold a U-shaped heating element is eight, compared with three channel type clamping arrangements of the prior art, with the total cost of eight spring retainer clips constructed according to the invention being only about one half of the total cost of spring clips constructed according to the teachings of my U.S. Patent, and only about one-eighth the total cost of three prior art channel type clamping arrangements, which, in addition to an elongated metallic channel, requires two hooks, two helical springs, and two large washers, for each clamping assembly.

I claim as my invention:

1. An evaporator coil heat exchanger assembly comprising:

a plurality of refrigerant carrying tubes, a plurality of cooling fins disposed in heat conducting relation about said tubes, said cooling fins being disposed in spaced relation with a predetermined spacing, with said spaced fins having edges in a common plane to collectively define a discontinuous surface which is spaced from said refrigerant carrying tubes, a heating element for defrosting the evaporator coil section, and a plurality of spring retainer clips disposed to hold said heating element against the discontinuous surface defined by the edges of said cooling fins, each of said spring retainer clips being a single piece of wire having a diameter which is less than the predetermined spacing between cooling fins, said single piece of wire having first and second ends, first and second curved end sections at the first and second ends, rspectively, having facing concave portions, and at least one intermediate curved section which functions as both a spring and handle, said first and second curved end sections, and the at least one intermediate curved section, being disposed in a common plane, to enable the associated portions of the spring retainer clip to fit in the predetermined spacing between adjacent cooling fins, said first curved end section being disposed between spaced cooling fins and hooked over a refrigerant carrying tube of said evaporator section, said second curved end section being outside said fins, adjacent to said discontinuous surface, and disposed about said heating element, said first and second curved end sections being spaced from one another by a predetermined dimension selected to cause the intermediate curved portion of each spring retainer clip, when stressed, to cause the second curved end section to exert a force against the heating element which holds the heating element against the discontinuous surface defined by the edges of said cooling fins.

2. The assembly of claim 1 wherein the first curved end section, the at least one curved intermediate section, and the second curved end section, are circular, and having curved arcs of about 120 degrees, 210 degrees, and 75 degrees, respectively.

3. The assembly of claim 1 wherein the first and second curved end sections are each spaced from the at least one intermediate curved section by first and second straight sections of the wire.

4. The assembly of claim 1 wherein the at least one intermediate curved section is spaced from the second curved end section by a second intermediate curved section.

5. The assembly of claim 4 wherein the second intermediate curved section and the second curved end section define circular curves of like radii.

6. The assembly of claim 4 including a straight section separating the first and second intermediate curved sections.

* * * * *

UNITED STATES PATENT AND TRADEMARK OFFICE
CERTIFICATE OF CORRECTION

PATENT NO. : 4,766,736

DATED : August 30, 1988

INVENTOR(S) : William L. Waldschmidt

It is certified that error appears in the above-identified patent and that said Letters Patent is hereby corrected as shown below:

On the front data page, Item (73) "Assignee" should read as follows:

-- Thermo King Corporation
Minneapolis,
Minnesota --.

Signed and Sealed this

Twenty-eighth Day of March, 1989

Attest:

DONALD J. QUIGG

Attesting Officer

Commissioner of Patents and Trademarks